United States Patent

Freeman

[11] Patent Number: 5,477,385
[45] Date of Patent: Dec. 19, 1995

[54] OPTICAL MAGNIFYING APPARATUS

[75] Inventor: Robin J. Freeman, Surrey, United Kingdom

[73] Assignee: Vision Engineering Limited, Surrey, United Kingdom

[21] Appl. No.: 211,418

[22] PCT Filed: May 7, 1993

[86] PCT No.: PCT/GB93/00942

§ 371 Date: Mar. 28, 1994

§ 102(e) Date: Mar. 28, 1994

[87] PCT Pub. No.: WO94/06048

PCT Pub. Date: Mar. 17, 1994

[30] Foreign Application Priority Data

Sep. 3, 1992 [GB] United Kingdom ............ 9218628

[51] Int. Cl.⁶ ............................................. G02F 1/13
[52] U.S. Cl. ..................... 359/629; 359/631; 359/633; 359/639
[58] Field of Search ............................... 359/629, 638, 359/631, 632, 633, 634, 641, 65, 38, 70, 639

[56] References Cited

U.S. PATENT DOCUMENTS

| | | |
|---|---|---|
| 3,914,030 | 10/1975 | Weiss . |
| 4,163,542 | 8/1979 | LaRussa ................. 359/36 |
| 4,799,763 | 1/1989 | Davis et al. . |
| 4,840,455 | 6/1989 | Kempf . |
| 4,859,031 | 8/1989 | Berman et al. ................ 359/629 |
| 4,896,952 | 1/1990 | Rosenbluth ................ 359/638 |
| 5,144,476 | 9/1992 | Kebo . |
| 5,189,452 | 2/1993 | Hodson et al. ................ 359/629 |

FOREIGN PATENT DOCUMENTS 0076344  4/1983  European Pat. Off. .

Primary Examiner—David C. Nelms
Assistant Examiner—Vu A. Le
Attorney, Agent, or Firm—Shoemaker and Mattare, Ltd.

[57] ABSTRACT

Optical magnifying apparatus comprises an objective lens (11) from which light is directed to a beam splitting mirror (12). A portion of the light passes through the beam splitting mirror to a first concave mirror (13) and is reflected back via the beam splitting mirror through a viewing lens (5) to a first eye (16) of an observer. The remainder of the light is reflected by the beam splitting mirror to a second concave mirror (17) from which it is reflected back via the beam splitting mirror through the viewing lens to a second eye (19) of the observer. Focussed first and second images (14, 18) of an object (10) are produced respectively on the surfaces of the first and second concave mirrors. The optical axes of the concave mirrors are relatively offset such that the relayed pupils of the mirrors are separated horizontally by a distance approximately equal to the average interpupillary spacing of an observer. The relative inclination of the optical axes of the concave mirrors may be adjustable to enable non-stereoscopic or stereoscopic images of the object to be observed.

8 Claims, 1 Drawing Sheet

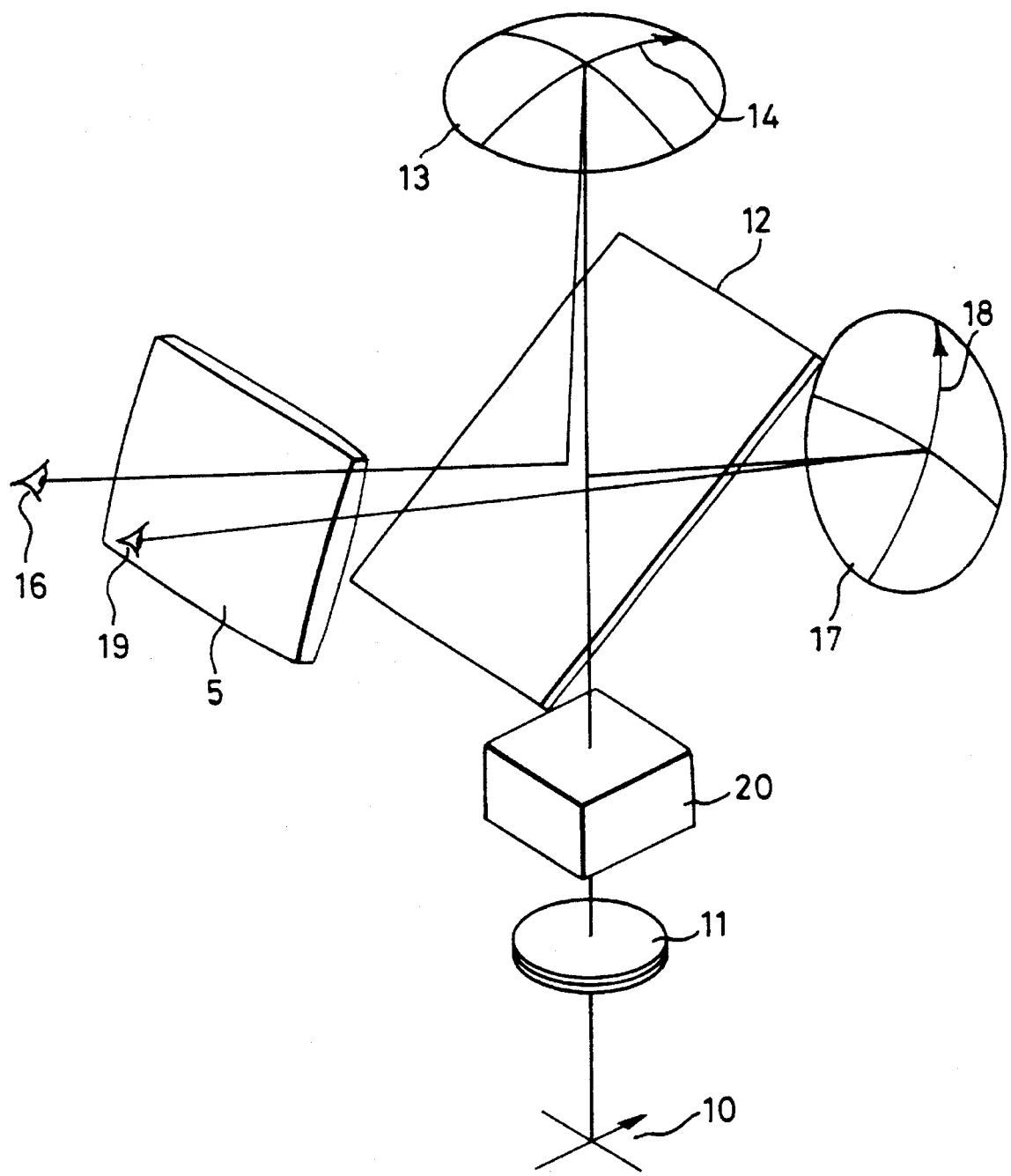

OPTICAL MAGNIFYING APPARATUS

This invention relates to optical magnifying apparatus for producing a magnified image of an object for viewing by an observer and in particular to such apparatus for producing a magnified binocular or stereoscopic image of an object.

While known single lens magnifiers are capable of providing low magnification factors, for example up to 2× of an object, such magnifiers are not capable of providing higher magnification factors, for example in the range 4× to 10×. Furthermore the exit pupil diameters provided by such single lens magnifiers are small and consequently restrict the position of the eyes of an observer from which the magnified image may be viewed. Also when it is desired to view the magnified image of the object stereoscopically with both eyes the relationship of the magnified image to the angle of view by each eye tends to be incorrect and confuses the observer.

According to the invention optical magnification apparatus comprises an object lens to receive light from an object to be viewed; beam splitting means to receive light emergent from said object lens and to direct a first portion of said emergent light to a first optical element and to direct a second portion of said emergent light to a second optical element; said first optical element including a first mirror and said second optical element including a second mirror; said first and second optical elements being so located that focussed first and second images of the object being viewed are produced by the object lens on said first and second mirrors respectively; and a viewing lens located to receive light constituting said first and second images and reflected by said first and second mirrors to produce magnified images of said object for perception by the eyes of an observer.

An embodiment of the invention will now be described by way of example with reference to the drawing which is a perspective view of the optical elements of optical magnifying apparatus in accordance with the invention.

Referring to the drawing, light from an object 10 is collected by an objective lens 11 and is directed to a beam splitting mirror 12. The beam splitting mirror 12 preferably comprises a half silvered planar mirror. A proportion of the light from the objective lens 11 passes through the beam splitting mirror and falls on a first concave mirror 13. The mirror 13 is located at a distance from the objective lens 11, in relation to the focal length of the objective lens 11, such that a focussed first image 14 of the object 10 is produced on the surface of the mirror 13. Light received by the mirror 13 is reflected back to the beam splitting mirror 12 where it is reelected and directed through a viewing lens 15 to one eye 16 of an observer. The remainder of the light from the objective lens 11 is reflected by the beam splitting mirror 12 to a second concave mirror 17 and a second focussed image 18 of the object 10 is produced on the surface of the mirror 17. Light received by the second concave mirror 17 is reflected back to pass through the beam splitting mirror 12 and thence through the viewing lens 15 to a second eye 19 of the observer. The curvature of the concave mirrors is such that the mirrors in combination with the viewing lens 15 produce, at the observer's eyes, images of the backstop of the objective lens 11.

It will be appreciated that if the optical axes of the concave mirrors 13 and 17 are orientated to be aligned with the optical axes of light incident thereon, the light reflected by the mirrors 13 and 17 after respective reflection by and passage through the beam splitting mirror will be aligned and will produce a single image of the object. Accordingly in order to produce images displaced from one another for viewing by the two eyes respectively of the observer, the optical axes of the mirrors 13, 17 are relatively offset such that the two relayed pupils of the mirrors 13 and 17 are separated horizontally by a distance approximately equal to the average interpupillary spacing of an observer. If desired means may be provided to vary the relative inclination of the optical axes of the mirrors 13, 17 to enable adjustment of the spacing of the relayed pupils of the mirrors to match the interpupillary spacing of the observer.

If the spacing of the pupils of the mirrors 13, 17 matches precisely the interpupillary spacing of the observer, the observer will perceive a binocular but not stereoscopic magnified image of the object 10. If it is desired to produce images which are perceived as a stereoscopic magnified view of the object 10 the optical axes of the mirrors 13, 17 are orientated relative to one another such that a small mismatch occurs between the spacing of the relayed pupil centres of the mirrors 13, 17 and the interpupillary spacing of the observer. With such a mismatch between the spacing of the relayed pupil centres and the interpupillary spacing of the observer the angle of view subtended from the object and perceived by each eye will be different thus providing the parallax required for stereoscopic viewing of the object 10. If desired the relative orientation of the optical axes of the concave mirrors may be such that the spacing of the relayed pupils of the mirrors causes the observer to perceive an inverse stereoscopic image of the object.

The images 14, 18 produced by the object lens 11 on the mirrors 13, 17 respectively are inverted and hence in order that the images perceived by the observer have the same orientation as the object an image inverting module 20 is located in the light path of the light between the object lens 11 and the beam splitting mirror 12.

In the embodiment described hereinbefore, concave mirrors 13 and 17 are provided and the images 13 and 18 are produced thereon to be perceived by an observer by means of the viewing lens 15. However if desired the concave mirrors 13, 17 may be replaced by positive lens elements in combination with mirrors.

I claim:

1. Optical magnification apparatus including an object lens (11) to receive light from an object (10) to be viewed characterised by beam splitting means (12) to receive light emergent from said object lens (11) and to direct a first portion of said emergent light to a first optical element (13) and to direct a second portion of said emergent light to a second optical element (17); said first optical element including a first mirror and said second optical element including a second mirror; said first and second optical elements being so located that focussed first and second images (14, 18) of the object (10) being viewed are produced by the object lens (11) on said first and second mirrors respectively; and a viewing lens (5) located to receive light constituting said first and second images and reflected by said first and second mirrors to produce magnified images of said object for perception by the eyes (16, 19) of an observer.

2. Optical magnification apparatus as claimed in claim 1 further characterised in that said beam splitting means (12) comprises a half silvered planar mirror.

3. Optical magnification apparatus as claimed in claim 1 or 2 further characterised in that the first and second optical elements (13, 17) comprise first and second concave mirrors respectively.

4. Optical magnification apparatus as claimed in claim 2 further characterised in that the first mirror (13) is located to receive light from the object lens (11) passing through the half silvered beam splitting mirror (12) and is orientated such that light from the first image (14) is reflected back to the half silvered mirror (12) and is reflected by the half silvered mirror to the viewing lens (5) and the second mirror (17) is located to receive light from said object lens (11) reflected by said half silvered mirror (12) and is orientated such that light from the second image (18) is reflected back to the half silvered mirror and passes through the half silvered mirror to said viewing lens (5).

5. Optical magnification apparatus as claimed in claim 1 further characterised in that the first and second mirrors (13, 17) are angularly orientated relative to one another such that centres of relayed pupils of said first and second mirrors are spaced apart in a direction corresponding to interpupillary spacing of an observer's eyes (16, 19).

6. Optical magnification apparatus as claimed in claim 5 further characterised in that the spacing of the relayed pupils matches the interpupillary spacing of the eyes of the observer so that the observer perceives a non-stereoscopic image.

7. Optical magnification apparatus as claimed in claim 5 further characterised in that the spacing of the relayed pupils differs from the interpupillary spacing of the eyes of the observer so that the observer perceives a stereoscopic image.

8. Optical magnification apparatus as claimed in claim 5 further characterised by the provision of means to vary the relative angular orientation of the first and second mirrors (13, 17).

* * * * *